(12) United States Patent
Hu (10) Patent No.: US 10,562,657 B2
(45) Date of Patent: Feb. 18, 2020

(54) PACKAGING MACHINE (71) Applicant: Shaobai Hu, Hangzhou (CN)

(72) Inventor: Shaobai Hu, Hangzhou (CN)

(*) Notice: Subject to any disclaimer, the term of this patent is extended or adjusted under 35 U.S.C. 154(b) by 93 days.

(21) Appl. No.: 15/776,792

(22) PCT Filed: Dec. 10, 2015

(86) PCT No.: PCT/CN2015/096893
§ 371 (c)(1),
(2) Date: May 17, 2018

(87) PCT Pub. No.: WO2017/084129
PCT Pub. Date: May 26, 2017

(65) Prior Publication Data
US 2018/0334278 A1 Nov. 22, 2018

(30) Foreign Application Priority Data

Nov. 17, 2015 (CN) .......................... 2015 1 0787320

(51) Int. Cl.
*B65B 57/00* (2006.01)
*B65B 61/06* (2006.01)
*G05B 19/418* (2006.01)
*B65B 9/04* (2006.01)
*B65B 59/04* (2006.01)

(52) U.S. Cl.
CPC ............... *B65B 57/00* (2013.01); *B65B 9/04* (2013.01); *B65B 59/04* (2013.01); *B65B 61/06* (2013.01); *G05B 19/418* (2013.01)

(58) Field of Classification Search
CPC .......... B65B 9/04; B65B 9/045; B65B 57/00; B65B 57/04; B65B 57/08; B65B 59/001; B65B 59/003; B65B 59/005; B65B 59/04; B65B 61/06; G05B 19/418
See application file for complete search history.

(56) References Cited

U.S. PATENT DOCUMENTS

2012/0289388 A1* 11/2012 Ehrmann ................ B29C 33/30
483/1

FOREIGN PATENT DOCUMENTS

| CN | 2835088 Y | 11/2006 |
|---|---|---|
| CN | 201329975 Y | 10/2009 |

(Continued)

*Primary Examiner* — George R Koch
(74) *Attorney, Agent, or Firm* — Gokalp Bayramoglu (57) ABSTRACT

A packaging machine, including a base film entering mechanism, a forming mechanism, a sealing mechanism, a cutting mechanism, a clip chain, a clip chain driving device, an electrical control device and a blade displacement driving device. The cutting mechanism is provided with the blade displacement driving device. The electrical control device is connected to the forming mechanism, the sealing mechanism, the cutting mechanism and the blade displacement driving device. One of the three mechanisms i.e. the forming mechanism, the sealing mechanism or the cutting mechanism is fixed, and its working reference line is determined. The electrical control device adjusts the other two mechanisms to a position with the working reference lines at an integer multiple of the mould width away from the working reference line of the position-determined mechanism and fix them accordingly. The forming mechanism and the sealing mechanism both use automatic mould replacing devices.

6 Claims, 8 Drawing Sheets (56) References Cited

FOREIGN PATENT DOCUMENTS

| CN | 103930349 | A  | 7/2014  |
|----|-----------|----|---------|
| EP | 2253545   | A1 | 11/2010 |

* cited by examiner

PACKAGING MACHINE

CROSS REFERENCE TO RELATED APPLICATIONS

This application is the national phase entry of International Application PCT/CN2015/096893, filed on Dec. 10, 2015, which is based upon and claims priority to Chinese Patent Application No. 201510787320.0, filed on Nov. 17, 2015, the entire contents of which are incorporated herein by reference.

TECHNICAL FIELD

The present invention relates to a packaging machine, which is mainly used in a packaging production line to perform packaging and cutting processing of materials (such as syringes, entry needles, infusion apparatus, surgical packages, medicines and foods, etc.).

BACKGROUND

The working principle of packaging machine in the prior art is as follows. On the machine, the packaging base film (abbreviated to base film, which is a plastic film) is clamped on both sides by the clip chain and brought into the machine; the drive of the machine makes clip chain bring the base film into the molding area each time when moving a single-mould distance. Under the action of the mould, the base film is formed into a plurality of mould cavities suitable for placing the material by heating and blistering; the base film enters the material placing area, and the material is put into the mould cavity of the base film manually or by an auxiliary machine. The cover film (or paper) enters the machine and covers the opening of the mould cavity, and enters the sealing area together with the mould cavity. The mould cavity must fall into the mould cavity located in the sealing mould accurately. The sealing mechanism is used to seal the base film filled with the material with the cover film (or paper), and then the packaging is completed; the packaging enters the cutting area, the cutting blade must also be aligned with the cutting site, the cutting mechanism cuts the attached packaging into single body that is convenient to use; the wrapped single package is outputted from the discharge port, thus the entire work of the packaging line is completed.

At the beginning of each work, the corresponding moulds (including forming moulds and sealing mould) of the packaged goods are first replaced on the machine. The size of the moulds are matched, and then the mould alignment is performed. Different moulds suitable for the materials are required for packaging different materials. Every time a batch of products is changed, both of the forming mould and the sealing mould must be replaced. The replacement of the mould needs to be completed by a professional. After the mould is replaced, the mould alignment, adjustment, mould test and re-adjustment must be performed until the position is accurate, then the normal production can be performed. The work is complex, cumbersome, time-consuming and material-consuming, and advanced technology is required. The mould is heavy, the replacement of the mould requires professional and strong personnel to complete. After the blister forming, the base film will accurately fall into the sealing mould after several single-mould distances driven by the machine. If there is any deviation, a sealing deviation displacement will be produced, at this time, the position of the forming mould or the sealing mould needs to be adjusted. Similarly, after sealing, the package should also fall into the cutting mould after a few single-mould distances, the position of the cutting mould needs to be adjusted. Sometimes the position of the forming and sealing moulds also need to be adjusted. Adjustments include rough adjustments, fine adjustments, test operations, etc. The normal work can be achieved after all requirements have been met. After the variety is changed, since the mould is different, the single-mould distance is different, and the above mentioned adjustment work must be repeated, i.e. the distances between the forming mechanism, the sealing mechanism and the cutting mechanism need to be adjusted frequently in the prior art. The adjustment work is complex and cumbersome, requires more packaging materials, consumes high energy and requires more time, and the requirements for the quality of adjustment personnel are also higher.

SUMMARY

The first technical problem solved by the present invention is that the forming mechanism, the sealing mechanism and the cutting mechanism are precisely positioned relative to each other, so that each product on the packaging machine is precisely aligned when passing through the forming mechanism, the sealing mechanism and the cutting mechanism. The second technical problem solved by the present invention is the problem of automatic co-positioning of the mould and the cross-cutting blade. The third technical problem solved by the present invention is to provide an automatic mould replacing device. The automatic mould replacing device has two similar sets. The first set of automatic mould replacing device is used for a sealing mechanism, and the second set of automatic mould replacing device is used for a forming mechanism, thereby achieving automatic mould replacement.

The technical solution used by the present invention to solve the technical problems of accurate positioning among the forming mechanism, the sealing mechanism and the cutting mechanism is as follows.

A packaging machine includes a base film entering mechanism, a forming mechanism, a sealing mechanism, a cutting mechanism, a clip chain and a clip chain driving device. The base film entering mechanism, the forming mechanism, the sealing mechanism and the cutting mechanism are arranged successively, which is characterized in that an electrical control device and a blade displacement driving device are further arranged. The blade displacement driving device is arranged on the cutting mechanism. The blade displacement driving device is connected to a cross-cutting blade. The electrical control device is connected to the forming mechanism, the sealing mechanism, the cutting mechanism and the blade displacement driving device. One of the three mechanisms i.e. the forming mechanism, the sealing mechanism or the cutting mechanism is fixed and the working reference line thereof is determined. The other two mechanisms are fixed at a position that their working reference line is away from the working reference line of the position-determined mechanism by an integral multiple of the mould width. The electrical control device adjusts the other two mechanisms to make them fixed at a position such that their working reference lines are away from the working reference line of the position-determined mechanism by an integral multiple of the mould width according to the working reference line of the fixed mechanism. The above-mentioned design realizes automatic alignment among the forming mechanism, the sealing mechanism and the cutting mechanism, thus, improving automation level and production efficiency, and reducing production costs.

The present invention also provides a forming mechanism driving device and a sealing mechanism driving device. The electrical control device is connected to the forming mechanism driving device and the sealing mechanism driving device. The forming mechanism driving device is connected to the forming mechanism, and the sealing mechanism driving device is connected to the sealing mechanism. The position of the cutting mechanism is first fixed, and the electrical control device adjusts the sealing mechanism working reference line to a position, that is away from the cutting mechanism working reference line by an integral multiple of the width of the mould, by the sealing mechanism driving device and then fixes the sealing mechanism. The forming mechanism working reference line is adjusted to a position, that is away from the sealing mechanism working reference line by an integral multiple of the mould width by the forming mechanism driving device and the forming mechanism is fixed.

The second technical problem solved by the present invention is the problem of co-positioning of the mould and the cross-cutting blade. The centerline of the mechanism is used as the working reference line of the mechanism of the present invention. The centerline of the forming mould coincides with the forming mechanism working reference line. The centerline of the sealing mould coincides with the sealing mechanism working reference line. The forming mould and the sealing mould are both N-row mould. The width of mould is L, the cross-cutting blade is provided with N cross-knives. The electrical control device makes the distance between the adjacent cross-knives to be L/N through the blade displacement driving device. The distance between the centerline of the cross-cutting blade and the cutting mechanism working reference line is L/2N. This design solves the problem of automatic co-positioning of the mould and the cross-cutting blade, further improving the automation level and production efficiency.

In the present invention, after the package is changed, the forming mould and the sealing mould are replaced. The parameters (mould width, single or dual mould, etc.) are input on the control screen of the electrical control device. The spacing of the double-row cutting blade is moved to an accurate position by numerical control. The sealing mechanism driving device detects and displaces the sealing mechanism (the spacing between the sealing mechanism working reference line and the cutting mechanism working reference line is maintained at an integer multiple of the mould width). The forming mechanism driving device detects and displaces the forming mechanism (the spacing between the forming mechanism working reference line and the sealing mechanism working reference line is maintained at an integer multiple of the mould width). After adjustment, the machine performs normal production work.

The third technical problem solved by the present invention is to provide an automatic mould replacing device. The forming mechanism and the sealing mechanism both use an automatic mould replacing device. The automatic mould replacing device includes a mould elevating mechanism, a mould bracket, a numerical control indexing driving mechanism, indexing shaft, mould mounting frame and upper mould. The upper mould is mounted in the upper part of the rack. The electrical control device is connected to the mould elevating mechanism and the numerical control indexing driving mechanism. The mould elevating mechanism is connected to the mould bracket. The mould bracket is slidingly connected to the rack. The numerical control indexing driving mechanism and the indexing shaft are mounted on the mould bracket. The numerical control indexing driving mechanism is connected to the indexing shaft. The mould mounting frame is fixedly mounted on the indexing shaft. A plurality of moulds radially and evenly distributed are fixedly mounted on the mould mounting frame. The electrical control device controls the mould elevating mechanism and the numerical control indexing driving mechanism to work. The upper mould cooperates with the mould. The mould elevating mechanism drives the mould bracket to a suitable position, the numerical control indexing driving mechanism drives the indexing shaft to an appropriate angle, so that a certain mould on the mould mounting frame enters the working position and the other moulds enter the waiting position. The above mentioned design realizes the automatic replacement of the mould, having a high degree of automation, reducing the professional requirements of the operating personnel and the labor load. Meanwhile it saves time, material consumption and energy, etc., thus, improving production efficiency and reducing production costs.

When the number of moulds is four, the radial difference between two adjacent moulds is 90 degrees.

When the number of moulds is three, the radial difference between two adjacent moulds is 120 degrees.

The mould elevating mechanism uses a cylinder.

The mould is pre-mounted on the mould mounting frame, and each mould number is input into the electrical operating system. In working condition, the mould number to be operated next is notified to the electrical operating system, and the electrical operating system automatically rotates the corresponding mould to the working position, then the normal production may be performed.

The present invention provides a packaging machine with a reasonable overall design and a high degree of automation. The automatic alignment among the forming mechanism, the sealing mechanism and the cutting mechanism, the automatic co-positioning of the mould and cross-cutting blade, and the automatic replacement of the mould are realized without manual adjustment. Thereby the machine is made smart, the professional requirements of the operating personnel and the labor load are reduced, and time, material consumption and energy are saved, thus, improving the production efficiency and reducing the production cost.

In the drawings:
1: base film entering mechanism;
2: forming mechanism, blister forming the base film;

3: material placing area (material is put into the formed base film);

4: sealing mechanism, covering the sealing mould with a cover film and performing heat sealing to form an integral;

5: cover film (or paper) entering area;

6: cutting mechanism, cutting the continuous packaged packages into single ones;

7: discharge area;

8: base film;

9: clip chain (clamping the base film until the packaging completes and reaches the discharge area);

10: mould cavity after base film is formed;

11: material;

13: electrical control device;

14: clip chain driving device (driving clip chain to move a distance of mould width each segment, pause and then go to next circulation until the work of three mechanisms are completed);

15: sealing mechanism driving device;

16: forming mechanism driving device;

17: cutting mechanism working reference line;

18: sealing mechanism working reference line;

19: forming mechanism working reference line;

20: cover film (or paper);

21, mould, a plurality of moulds are evenly and radially distributed on the mould mounting frame;

21-1: forming moulds mounted on the forming mechanism;

21-2: sealing moulds mounted on the sealing mechanism;

23: cross-cutting blade mounted on a cutting mechanism;

24: slitting blade mounted on the rack;

25: excess waste offcut after cutting;

26: finished product after packaged and cut;

27: mould elevating mechanism, driving the mould bracket to move up and down, lifting when the mould is closed, and descending when demoulding;

28: mould bracket, both ends of the mould bracket support the indexing shaft through the bearing, controlled to move up and down by the mould elevating mechanism;

29: indexing shaft, connected to numerical control indexing driving mechanism, controlled by numerical indexing driving mechanism, and driving the mould mounting frame to rotate;

30: mould mounting frame, a plurality of moulds may be mounted, controlled to rotate by the indexing shaft;

31: numerical control indexing driving mechanism, mounted on the mould bracket, controlled to drive indexing shaft to rotate by the electrical control device;

32: upper mould, standard universal type, mounted on the rack of the packaging machine, withstanding the nether mould when closing the mould, and undertaking the sealing action;

33: rack, used to mount various parts of the packaging machine.

DETAILED DESCRIPTION

Referring to FIG. 1 to FIG. 8, a packaging machine according to an embodiment of the present invention includes a base film entering mechanism 1, a forming mechanism 2, a sealing mechanism 4, a cutting mechanism 6, a clip chain 9 and a clip chain driving device 14. The base film entering mechanism 1, the forming mechanism 2, the sealing mechanism 4 and the cutting mechanism 6 are arranged successively. The improved design includes the electrical control device 13, the forming mechanism driving device 16, the sealing mechanism driving device 15 and the blade displacement driving device. The cutting mechanism 4 is provided with the blade displacement driving device. The blade displacement driving device is connected to the cross-cutting blade 23. The electrical control device 13 is connected to the forming mechanism driving device 16, the sealing mechanism driving device 15 and the blade displacement driving device. Firstly, the position of one of the three mechanisms i.e. the forming mechanism 2, the sealing mechanism 4 or the cutting mechanism 6 is fixed and the working reference line thereof is set, and then the electrical control device 13 automatically adjusts the other two mechanisms to a position that their working reference lines are from the working reference line of the position-determined mechanism by an integral multiple of the mould width L away and get them fixed. The working reference lines are set by using centerlines of the three mechanisms (see FIG. 1) or other setting positions. The centerline of the forming mould 21-1 coincides with the forming mechanism working reference line 19, and the centerline of the sealing mould 21-2 coincides with the sealing mechanism working reference line. The initial working positions of the three mechanisms may also be used as the working reference lines. The longitudinal direction refers to the direction in which the base film moves on the packaging machine, i.e. the direction of moving from the forming mechanism 2 to the cutting mechanism 6 (left-right direction in FIG. 1). The horizontal direction refers to the horizontal direction perpendicular to the longitudinal direction, i.e. up-down direction in FIG.3. The mould 21 includes the forming mould 21-1 and the sealing mould 21-2. The forming mould 21-1 and the sealing mould 21-2 are matched in size and have the same number of longitudinal rows.

In this embodiment, the cutting mechanism 6 is fixed and its working reference line is set. The cutting method is the whole cutting, and the whole cutting includes cross-cutting and slitting. The parameter settings of the electrical control device 13 include: the mould width L (left-right direction width of the mould 21, when the mould 21 is composed of a plurality of rows of moulds, it is the total width of the plurality of rows of moulds, see FIG. 4), the number of longitudinal rows and the transverse number. After the corresponding moulds 21 of the materials need to be packaged are loaded into the respective mechanisms, the data of the used moulds 21 are input into the electrical control device 13. The data includes the number of longitudinal rows, the mould width L mould and the transverse number. Firstly, the electrical control device 13 automatically arranges the number and position of the longitudinal rolling blade in the slitting blade 24 according to the selection of the parameters of the transverse number of the mould 21; then the electrical control device 13 moves the cross-cutting blade 23 into position by the blade displacement driving device (when the cross-cutting blade 23 is a cross-cutting knife and has one row of mould, the cross-cutting blade 23 is located at a position 0.5 L away from the left or right of the cutting mechanism working reference line 17; when the cross-cutting blade 23 has two knives and has two rows of moulds, a cross-cutting knife in the cross-cutting blade 23 is aligned with the cutting mechanism working reference line 17, and the distance between the two cross-cutting knives in the cross-cutting blade 23 is 0.5 L). Then the distance and offset of the cutting mechanism working reference line 17 and the sealing mechanism working reference line 18 is automatically measured and calculated through the prior art (the initial positions of the cutting mechanism 6, the sealing mechanism 4 and the forming mechanism 2 may also be input in the electrical control device 13, and the distance and offset between the sealing mechanism 4 and the cutting mechanism 6, the distance and offset between the forming mechanism 2 and the sealing mechanism 4 are calculated by the parameters of the mould 21). The offset is transmitted to the sealing mechanism driving device 15 to make the sealing mechanism 4 move to a position such that the distance between two working reference lines is an integral multiple of the mould width L, the sealing mechanism 4 is automatically fixed, and the position of the sealing mechanism 4 is determined. Similarly, the electrical control device 13 automatically measures and calculates the distance and offset between the sealing mechanism working reference line 18 and the forming mechanism working reference line 19, the offset is transmitted to the forming mechanism driving device 16 to make the forming mechanism 2 move to a position such that the distance between the two working reference lines is an integral multiple of the mould width L, and the forming mechanism 2 is automatically fixed, the position of the forming mechanism 2 is determined. The electrical control device 13 confirms the mutual positions of the three mechanisms. After the accuracy is confirmed, the electrical control device 13 prompts the completion of the operation, and the machine may enter the normal working procedure for production.

In this embodiment, the number of cross-cutting blades 23 is the same as the number of rows of the mould 21. Assuming that the number of the cross-cutting blades 23 and the number of the rows of the mould 21 are positive integers N, the forming mould 21-1 and the sealing mould 21-2 are both N-row moulds, the cross-cutting blades 23 are provided with N cross-cutting knives. The distance between adjacent cross-cutting knives is L/N, and the distance between the centerline of the cross-cutting blade 23 and the cutting mechanism working reference line is L/2N.

Figure 1:
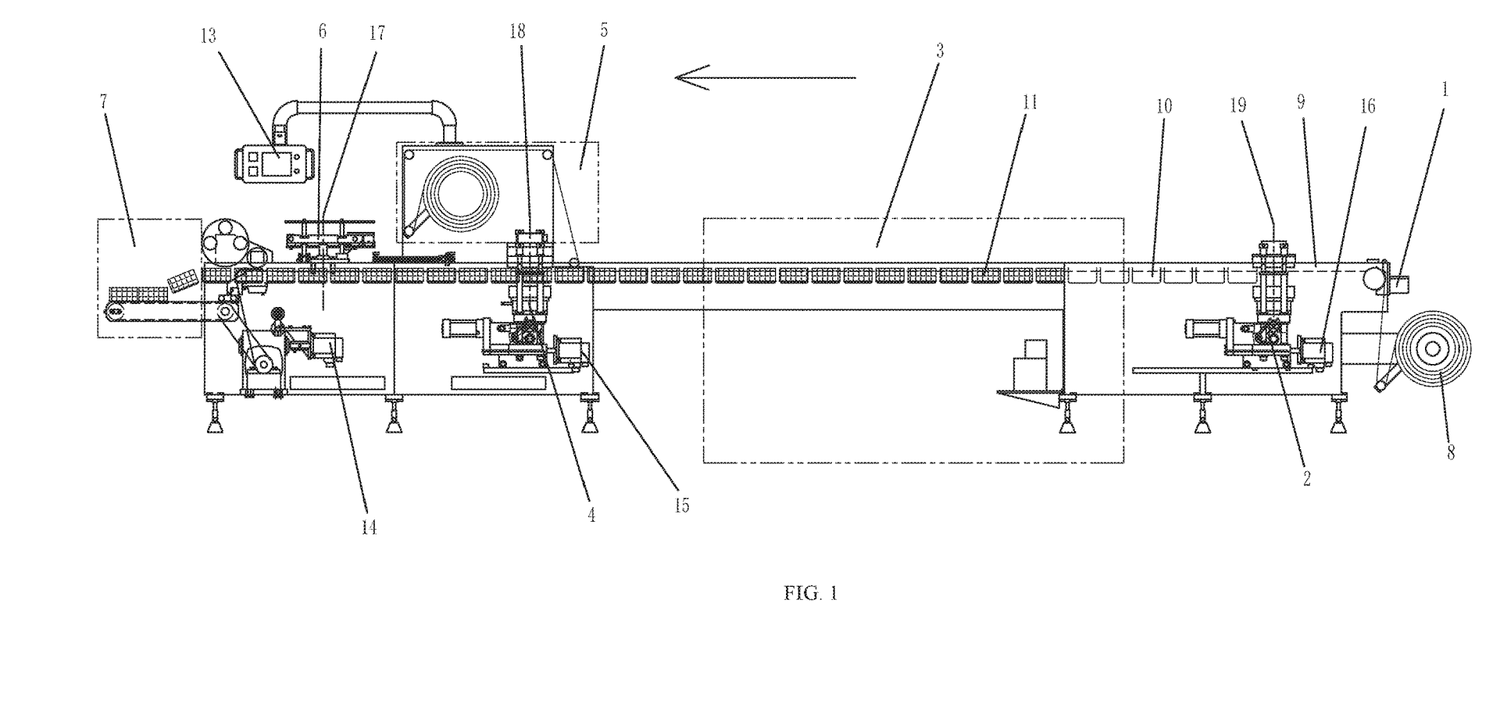
FIG. 1 is a schematic view of a packaging machine according to the present invention.
Figure 2:
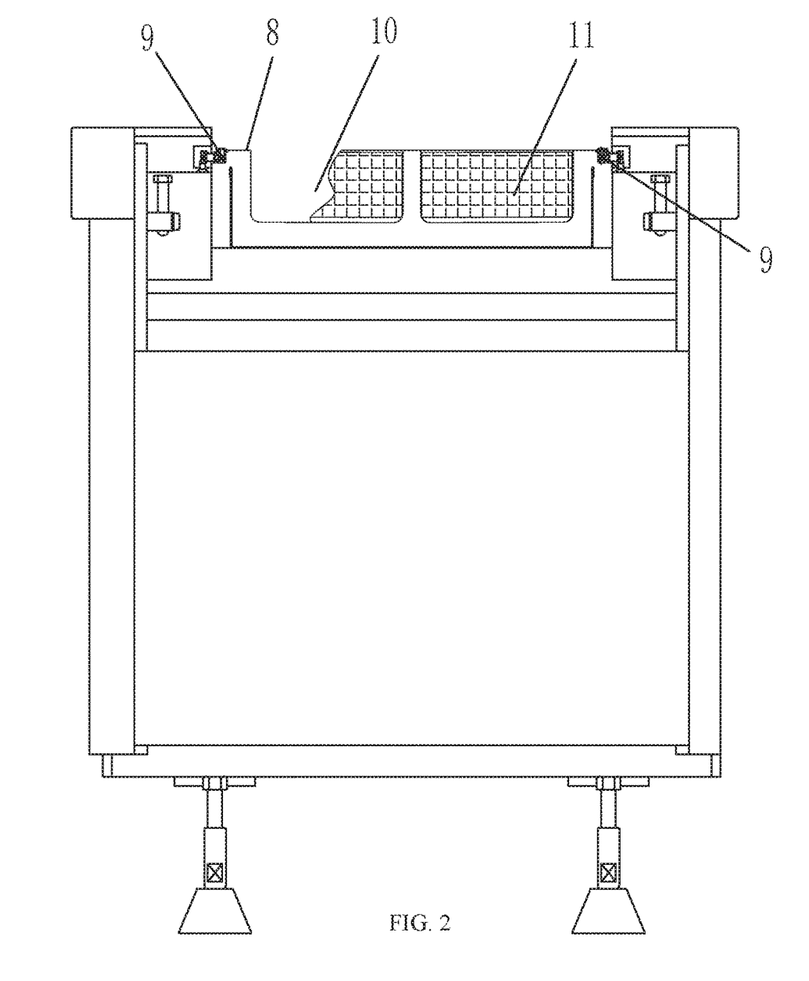
FIG. 2 is a sectional view of the main body structure of the packaging machine of the present invention.
Figure 3:
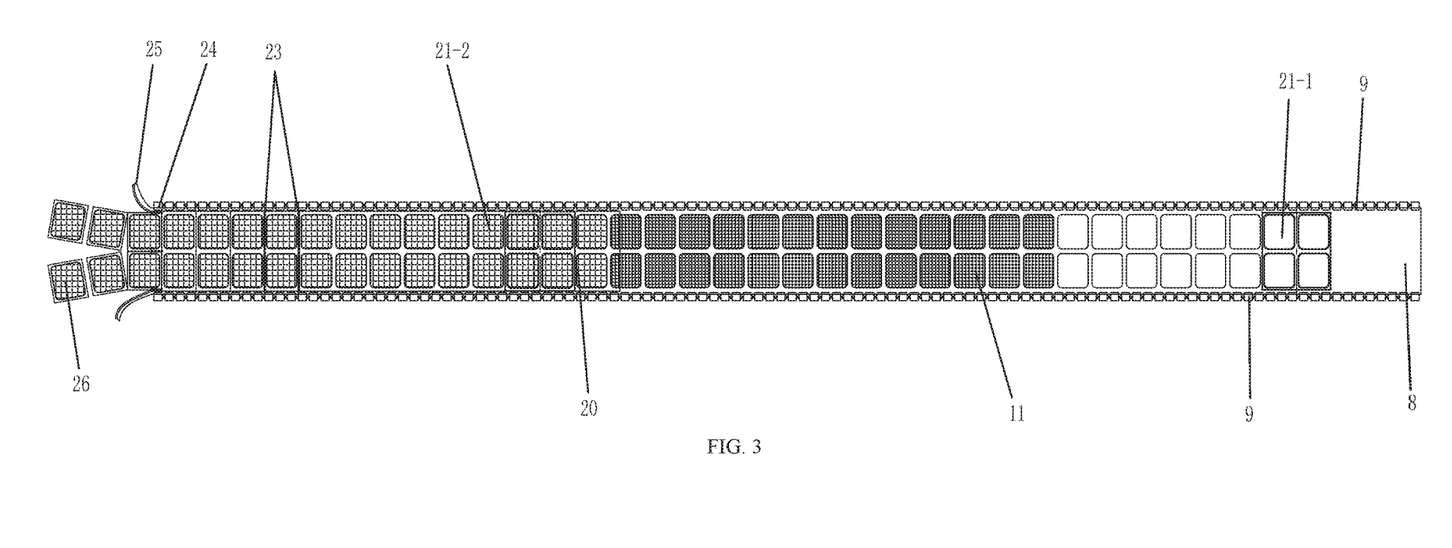
FIG. 3 is a top view of the packaging machine according to the present invention after a rack is removed.
Figure 4:
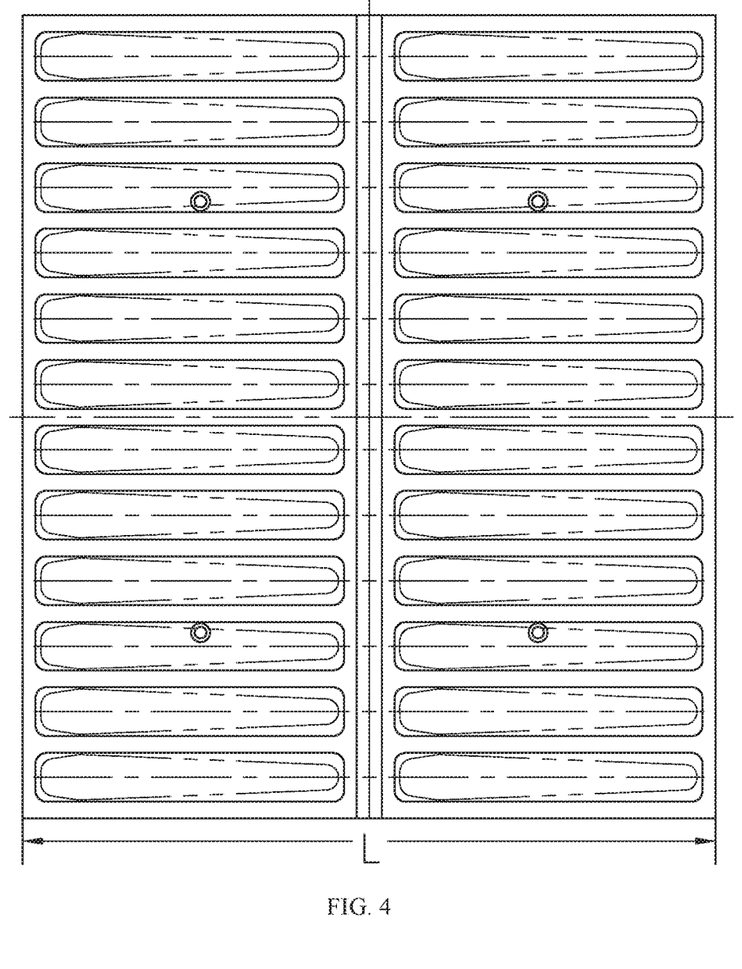
FIG. 4 is a plan view of the mould (including the forming mould, the sealing mould) in FIG. 3.

The mould 21 shown in FIG. 4 is used as an example to illustrate. The parameters of mould are input into the operating menu of the electrical control unit 13 (computer) (the mould width L, double rows), as shown in FIG. 1, the cross-cutting blade 23 has 2 cross-cutting knives and the distance between the two cross-cutting knives is L/2. The electrical control device 13 moves the two cross-cutting blades mounted on the cutting mechanism 6 to a position such that the distance between the centerline of the cross-cutting blade 23 and the cutting mechanism working reference line 17 is L/4. The electrical control device 13 detects the distance between the cutting mechanism working reference line 17 and the sealing mechanism working reference line 18. The sealing mechanism 4 is moved to a position that is two to twelve times of the mould width L away, through the numerical control sealing mechanism driving device 15, i.e. the distance between the cutting mechanism working reference line 17 and the sealing mechanism working reference line 18 is 2-12 L. The sealing mechanism driving device 15 is locked. The electrical control device 13 detects the distance between the sealing mechanism working reference line 18 and the forming mechanism working reference line 19, the forming mechanism 2 is moved to a position that is four to thirty times of the mould width L away, by the numerical control forming mechanism driving device 16, i.e. the distance between the sealing mechanism working reference line 18 and the forming mechanism working reference line 19 is 4-30 L, and the forming mechanism driving device 16 is locked, the alignment of the machine is completed, the normal work may be performed. The moving distance between the sealing mechanism 4 and the forming mechanism 2 is determined according to the actual situation, and is usually moved to a nearest position that is at a distance of an integer multiple of the mould width L, i.e. is moved the left by the remainder (i.e. leftward offset) obtained through dividing actual distance by the mould width L or mould width L moved to the right minus the remainder obtained by dividing actual distance by the mould width L (i.e. rightward offset). For example, the mould width L is 498 mm, the electrical control device 13 detects that the distance between the cutting mechanism working reference line 17 and the sealing mechanism working reference line 18 is 1097 mm, and 1097÷498=2, the remainder 101 is calculated, and the sealing mechanism 4 is moved to left by the remainder 101 mm through the numerical control sealing mechanism driving device 15 (i.e. the distance between the cutting mechanism working reference line 17 and the sealing mechanism working reference line 18 is 2L) or moved to the right by a distance equal to L(the mould width)−101=498−101=397 mm (i.e. the distance between the cutting mechanism working reference line 17 and the sealing mechanism working reference line 18 is 3L), and the sealing mechanism driving device 15 is locked; the electrical control device 13 detects that the distance between the sealing mechanism working reference line 18 and the forming mechanism working reference line 19 is 3943 mm, and calculates 3943÷498=7 remainder 457, the forming mechanism 2 is moved to the left by 457 mm through the numerical control mechanism driving device 16 (i.e. the distance of the sealing mechanism working reference line 18 to the forming mechanism working reference line 19 is 7L) or moved to the right by a distance equal to L (the mould width) −457=498−457=41 mm (i.e., the distance of the sealing mechanism working reference line 18 to the forming mechanism working reference line 19 is 8L), the forming mechanism driving device 16 is locked, and the alignment of the machine is completed.

The automatic mould replacing device of the present invention has two similar sets. The first set of automatic mould replacing device is used to replace the sealing mould 21-2 for the sealing mechanism 4 and is located at the rear part of the packaging machine. The second set of automatic mould replacing device is used to replace the forming mould 21-1 for the forming mechanism 2 and is located at the front part of the packaging machine. The front part and rear part are relative to the moving direction of the product of the packaging machine, the moving direction of product is shown by the arrow in FIG. 1. The automatic mould replacing device includes a mould elevating mechanism 27, a mould bracket 28, a numerical control indexing driving mechanism 31, an indexing shaft 29, a mould mounting frame 30 and an upper mould 32. The upper mould 32 is mounted on the rack 33 and is a standard universal equipment, and is matched with the mould 21 (for various moulds 21); the electrical control device 13 is connected to the mould elevating mechanism 27 and the numerical control indexing driving mechanism 31. The mould elevating mechanism 27 is connected to the mould bracket 28, the mould bracket 28 is slidingly connected to the rack 33. The numerical control indexing driving mechanism 31 and the indexing shaft 29 are mounted on the mould bracket 28. The numerical control indexing driving mechanism 31 is connected to the indexing shaft 29. The mould mounting frame 30 is mounted on the indexing shaft 29. A plurality of the moulds, radially and uniformly distributed, are mounted on the mould mounting frame 30. The electrical control device 13 controls the mould elevating mechanism 27 and the numerical control indexing driving mechanism 31 to work. The mould elevating mechanism 27 drives the mould bracket 28 to move up and down to an appropriate position. The numerical control indexing driving mechanism 31 drives the indexing shaft 29 to a position with suitable angle, such that a certain mould on the mould mounting frame 30 enters the working position, and other moulds enter the waiting position.

In the present invention, the mould bracket 28 is driven to move up and down by the mould elevating mechanism 27. The mould 21 is a mould set, and a mould set has a plurality of moulds 21. Each mould 21 is radially and uniformly mounted on the mould mounting frame 30. The mould 21 at the top is in the working position, and the other moulds 21 are in the cyclic waiting position. When mould bracket is moved up, the mould is closed, the mould 21 at the working position starts to work; when mould bracket is moved down, the mould is demoulded, the mould 21 at the working position finishes work and starts releasing the mould, the cycle repeats until the number of the required completed product is reached. The mould corresponding to the next kind of product is driven by the indexing shaft 29 that is driven by the numerical control indexing driving mechanism 31 to rotate to the working position. The previous mould 21 at the working position is rotated to the waiting position, and the above working process is continued. Since the mould mounting frame 30 has a plurality of moulds 21, one of the moulds 21 may be arbitrarily selected in this embodiment. When a mould 21 needs to be replaced, merely the indexing shaft 29 needs to be driven by the numerical control indexing mechanism 31 to rotate the corresponding mould 21 to the working position, thereby saving labor cost and time for replacing the mould 21.

Figure 5:
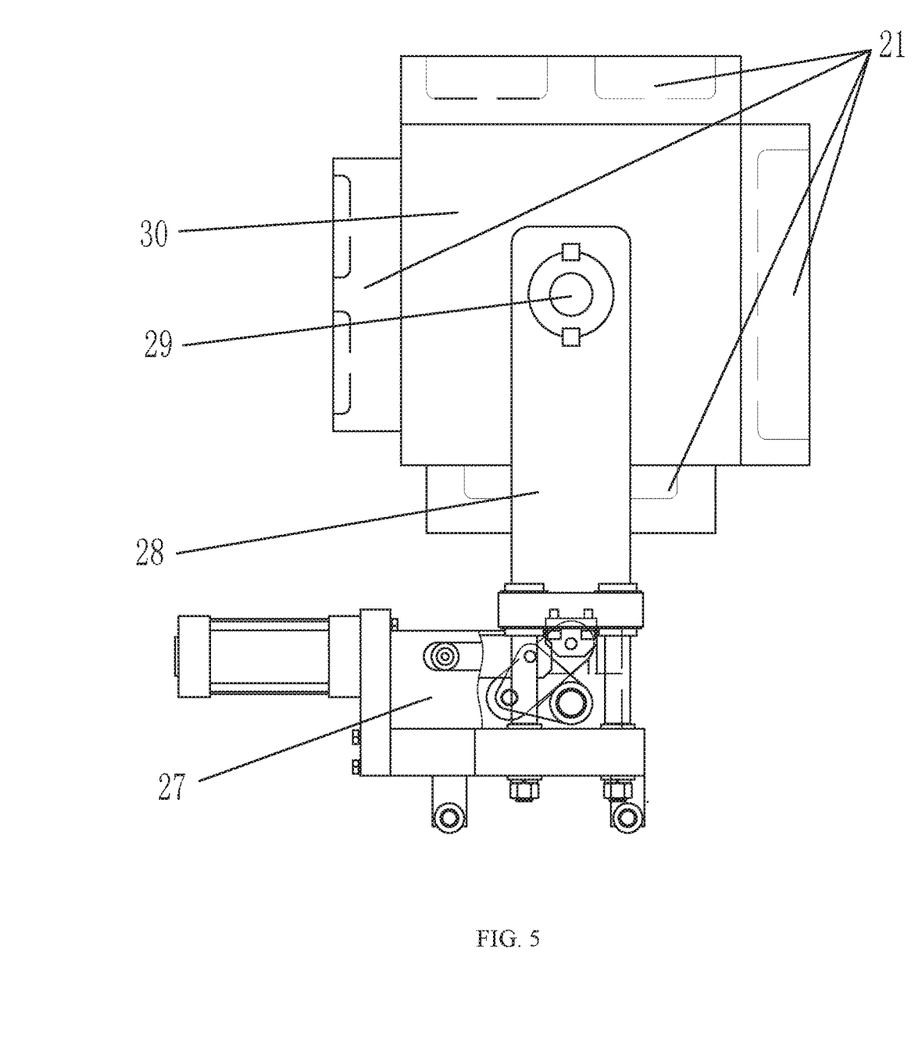
FIG. 5 is a structural schematic view of an automatic mould replacing device according to the present invention.
Figure 6:
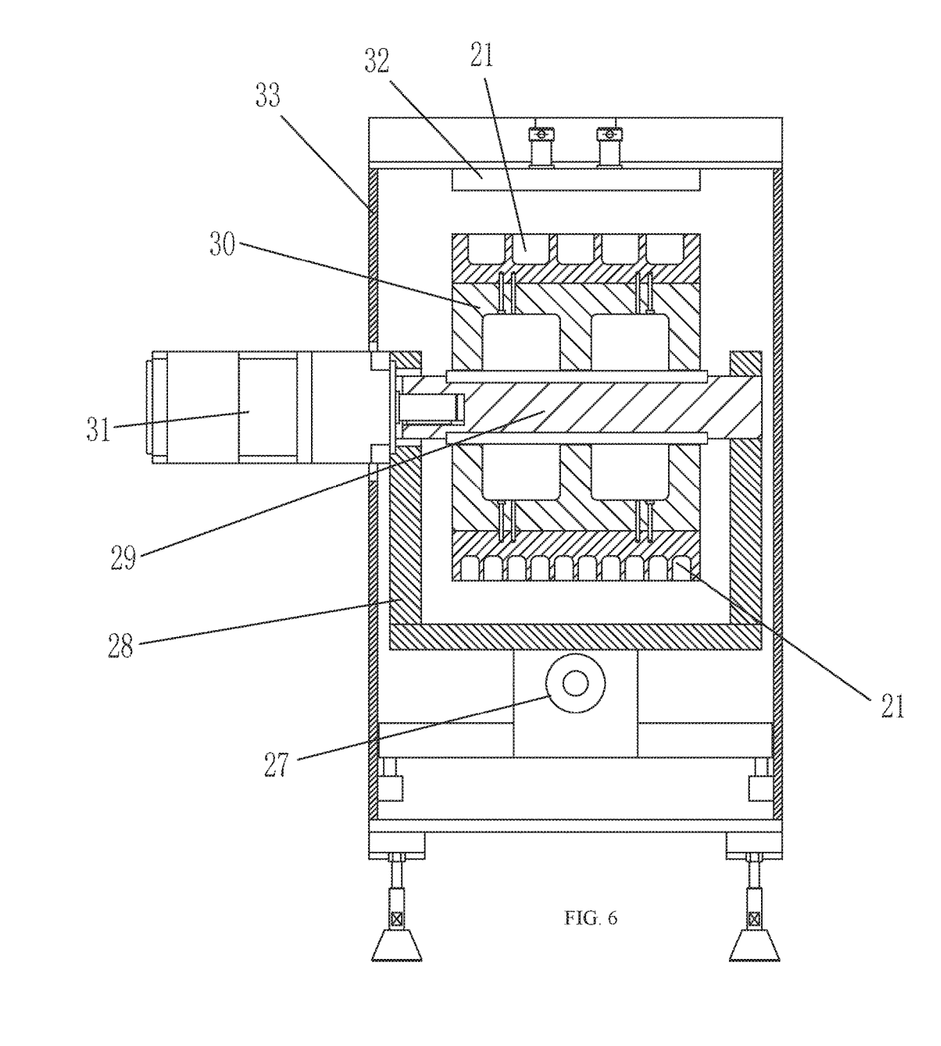
FIG. 6 is a cross-sectional schematic view of the automatic mould replacing device shown in FIG. 5, in which the working mould is in a demoulding state.
Figure 7:
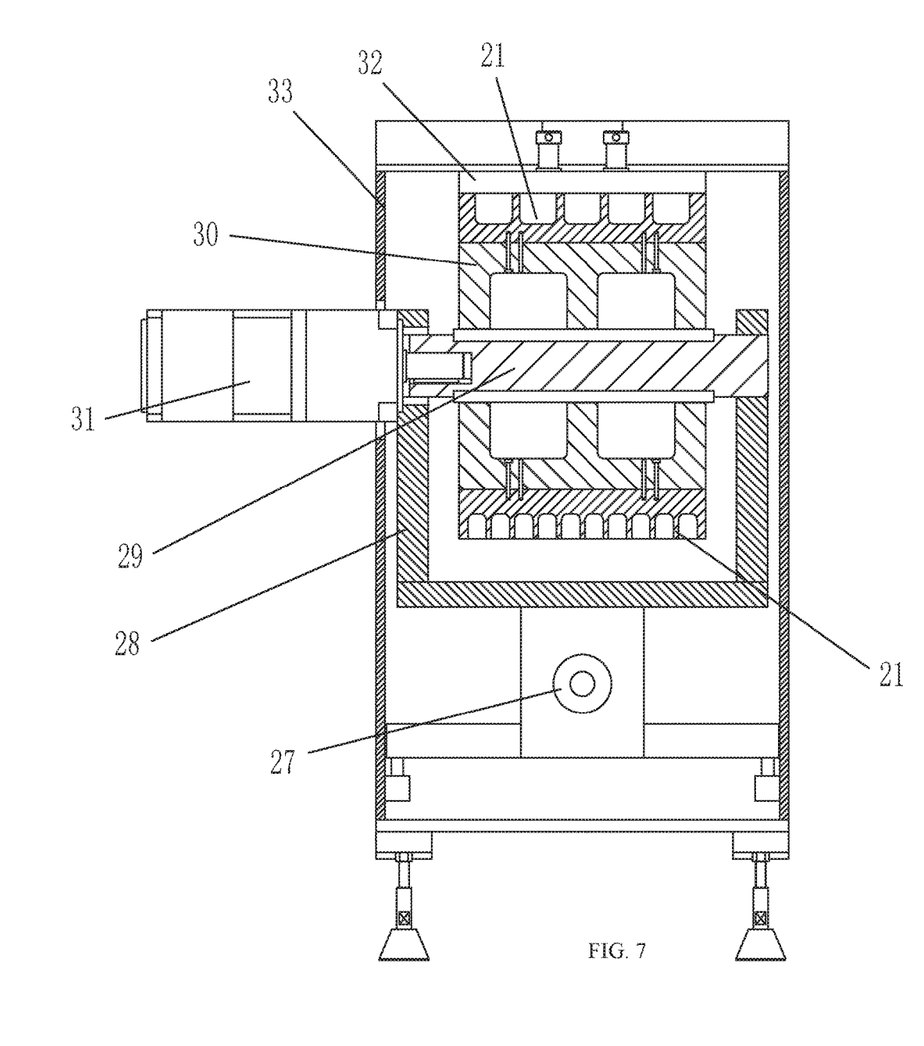
FIG. 7 is a cross-sectional schematic view of the automatic mould replacing device shown in FIG. 5, in which the working mould is in a mould closing state.

Referring to FIG. 5 to FIG. 7, as a special example, the mould 21 includes four moulds, and the four moulds are uniformly mounted on the mould mounting frame 30. The radial difference between the two adjacent moulds is 90 degrees. The position numbers of the four moulds are previously stored in the electrical control device 13; when the packaging materials are replaced, the corresponding mould number is notified to the electrical control device 13, and the electrical control device 13 automatically finds the location of the mould and issues an instruction to the numerical control indexing driving mechanism 31 to perform indexing rotation, the indexing shaft 29 and the mould mounting frame 30 are driven to rotate the corresponding mould to the working position (upward) and lock the corresponding mould; thereby the automatic mould replacement is completed, and the mould elevating mechanism 27 drives the mould bracket 28 and the mould 21 to move to complete the packaging work.

Figure 8:
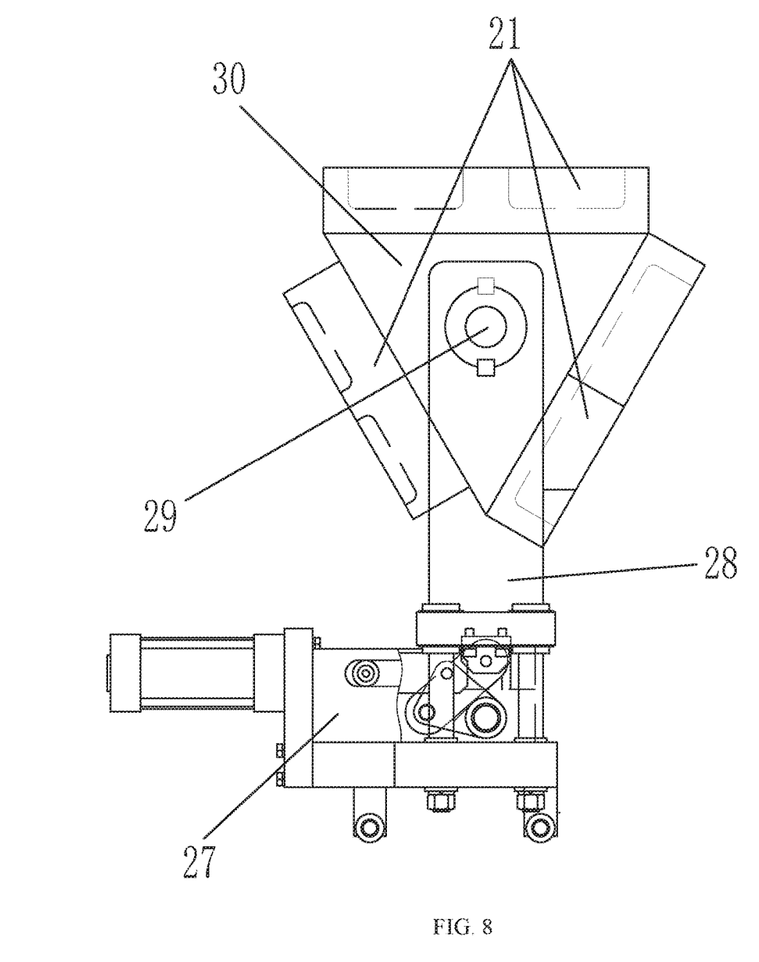
FIG. 8 is a schematic diagram of the main body structure of another automatic mould replacing device of the present invention.

Referring to FIG. 8, as another specific example, the mould 21 includes three moulds. The three moulds are uniformly mounted on the mould mounting frame 30. The radial difference between the two adjacent moulds is 120 degrees. The advantage thereof is the rotation space may be reduced, the working manner is the same as above.

The automatic mould replacing device may be similarly used for the sealing mechanism 4 and the forming mechanism 2. The feature of the present invention is to improve the working principle of the ordinary packaging machine, make it more intelligent, and make the form structure reliable and feasible.

The base film entering mechanism 1, the clip chain driving device 14, and the electric control device 13 of the present invention may use the prior art.

Any equivalent or simple changes made according to the structures, features, and principles described in the concept of the present invention are all included in the protection scope of the present invention.

What is claimed is:
1. A packaging machine, comprising:
a base film entering mechanism, a forming mechanism, a sealing mechanism, a cutting mechanism, a clip chain, and a clip chain driving device; the base film entering mechanism, the forming mechanism, the sealing mechanism and the cutting mechanism are arranged successively; wherein
an electrical control device and a blade displacement driving device are further provided; the blade displacement driving device is arranged on the cutting mechanism; the blade displacement driving device is connected to a cross-cutting blade; the electrical control device is connected to the forming mechanism, the sealing mechanism, the cutting mechanism and the blade displacement driving device; one of three mechanisms comprising the forming mechanism, the sealing mechanism and the cutting mechanism is fixed to form a position-determined mechanism and a working reference line of the position-determined mechanism is determined; the electrical control device adjusts the other two of the three mechanisms to a position to make working reference lines of the other two of the three mechanisms be an integral multiple of a mould width away from the working reference line of the position-determined mechanism and fixes the other two of the three mechanisms according to the working reference line of the position-determined mechanism wherein the forming mechanism and the sealing mechanism both use an automatic mould replacing device; the automatic mould replacing device comprises a mould elevating mechanism, a mould bracket, a numerical control indexing driving mechanism, an indexing shaft, a mould mounting frame, and an upper mould; the upper mould is mounted at an upper part of a rack; the electrical control device is connected to the mould elevating mechanism and the numerical control indexing driving mechanism; the mould elevating mechanism is connected to the mould bracket the mould bracket is slidingly connected to the rack; the numerical control indexing driving mechanism and the indexing shaft are mounted on the mould bracket the numerical control indexing driving mechanism is connected to the indexing shaft the mould mounting frame is fixedly mounted on the indexing shaft; a plurality of moulds are radially and uniformly distributed, and fixedly mounted on the mould mounting frame; the electrical control device controls the mould elevating mechanism and the numerical control indexing driving mechanism to work; and the upper mould cooperates with the plurality of moulds.
2. The packaging machine according to claim 1, further comprising:
a forming mechanism driving device and a sealing mechanism driving device;
the electrical control device is connected to the forming mechanism driving device and the sealing mechanism driving device; the forming mechanism driving device is connected to the forming mechanism; the sealing mechanism driving device is connected to the sealing mechanism; the electrical control device adjusts the working reference line of the sealing mechanism to a position to make the working reference line of the sealing mechanism be an integer multiple of the mould width away from the working reference line of the cutting mechanism and performs a fixation through the sealing mechanism driving device, and adjusts the working reference line of the forming mechanism to a position to make the working reference line of the forming mechanism be an integral multiple of the mould width away from the working reference line of the sealing mechanism and performs a fixation through the forming mechanism driving device.

3. The packaging machine according to claim 1, wherein a centerline of a forming mould coincides with the working reference line of the forming mechanism; a centerline of a sealing mould coincides with the working reference line of the sealing mechanism; the forming mould and the sealing mould are N-row moulds; the mould width is L; the cross-cutting blade is provided with N cross-cutting knives; the electrical control device makes a distance between adjacent cross-cutting knives to be L/N through the blade displacement driving device; a distance between a centerline of the cross-cutting knife and the working reference line of the cutting mechanism is L/2N.

4. The packaging machine according to claim 1, wherein a number of the plurality of moulds is four, a radial difference between the adjacent two moulds is 90 degrees.

5. The packaging machine according to claim 1, wherein a number of the plurality of moulds is three, a radial difference between adjacent two moulds is 120 degrees.

6. The packaging machine according to claim 2, wherein a centerline of a forming mould coincides with the working reference line of the forming mechanism; a centerline of a sealing mould coincides with the working reference line of the sealing mechanism; the forming mould and the sealing mould are N-row moulds; the mould width is L; the cross-cutting blade is provided with N cross-cutting knives; the electrical control device makes a distance between adjacent cross-cutting knives to be L/N through the blade displacement driving device; a distance between a centerline of the cross-cutting knife and the working reference line of the cutting mechanism is L/2N.

* * * * *